United States Patent [19]

Fischer

[11] 4,078,849

[45] Mar. 14, 1978

[54] ELECTRONIC CONNECTOR

[76] Inventor: Walter Fischer, 2, chemin du Point du Jour, Morges Vaud, Switzerland, CH-1110

[21] Appl. No.: 740,406

[22] Filed: Nov. 10, 1976

[30] Foreign Application Priority Data

Nov. 24, 1975 Switzerland ............... 15181/75

[51] Int. Cl.² .......................................... H01R 13/54
[52] U.S. Cl. .............................. 339/91 R; 339/186 M
[58] Field of Search ............... 339/91 R, 128, 176 R, 339/189 M, 186 M, 91 P

[56] References Cited

U.S. PATENT DOCUMENTS 3,096,135 7/1963 Feustel et al. .................. 339/186 M
3,560,908 2/1971 Dell et al. ........................ 339/128 X Primary Examiner—Roy Lake
Assistant Examiner—E. F. Desmond
Attorney, Agent, or Firm—Emory L. Groff, Jr.

[57] ABSTRACT

An electric connector comprises mutually interengageable plug elements retained together by resilient blades comprised between longitudinal slots in an outer cylindrical piece of one element, the blades having beaks engageable in a groove in the inner surface of an outer cylindrical piece of the other element and protuberances which can be gripped manually to release the beaks. The two elements have inner cylindrical parts with complementary pins and sockets and which can be set in any one of several corresponding defined angular positions in their outer cylindrical parts.

6 Claims, 5 Drawing Figures

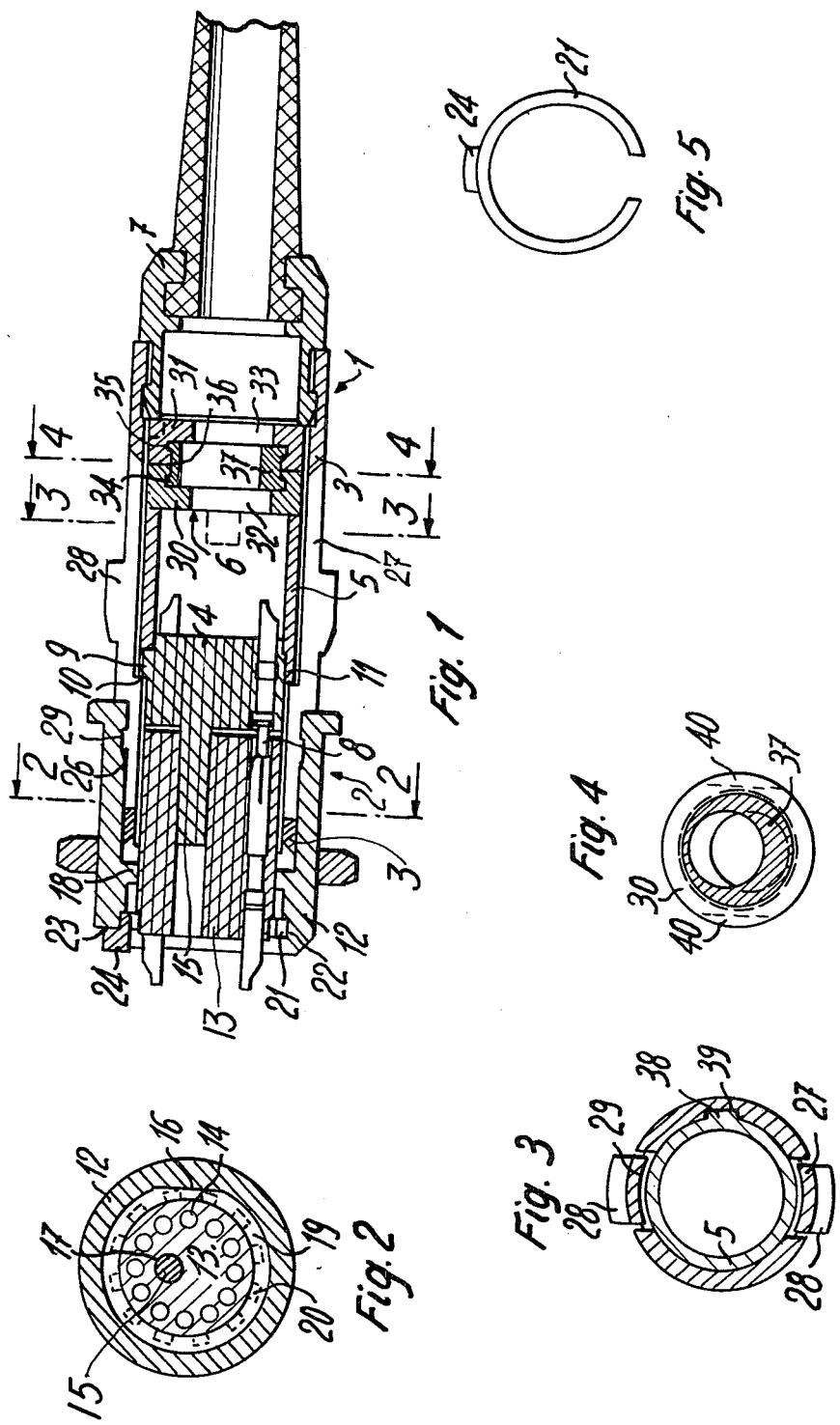

ELECTRONIC CONNECTOR

The invention relates to electric connectors of the type comprising two mutually interengageable plug elements having means for retaining the elements in an engaged position, said retaining means comprising at least one resilient part carried by one of the elements and having a hooking member engageable with a complementary portion of the other element, said resilient part including a gripping portion which is manually actuable to disengage the hooking member.

An aim of the invention is to simplify the manufacture of connectors of this type.

According to the invention, such a connector is characterized in that said resilient part is a blade forming part of the external surface of a cylindrical piece of said one element, said blade being comprised between two generally longitudinal slots in said cylindrical piece.

The accompanying drawings show, schematically and by way of example, an embodiment of the connector according to the invention.

FIG. 1 is an axial cross-section of the connector, with the two plug elements engaged in one another.

FIG. 2 is a cross-section of the female plug element along line 2—2 of FIG. 1.

FIG. 3 is a cross-section of the male plug element along line 3—3 of FIG. 1.

FIG. 4 is a cross-section of a gripping collar along line 4—4 of FIG. 1; and

FIG. 5 is an elevational view of a piece for securing and locking together two parts of the female plug element.

FIG. 1 shows a male plug element 1 connected to a female plug element 2.

The male plug element 1 comprises a cylindrical casing 3 in which are lodged a cylindrical piece 4 and a sleeve 5 provided with a stud 38 engaging in a groove 39 (FIG. 3) of the casing 3, so that the sleeve 5 is held in a fixed angular position relative to the casing 3. A gripping collar 6 is disposed between the sleeve 5 and a cylindrical stopper 7 which is retained in the casing 3 in a known manner to hold all of these parts together axially.

The cylindrical piece 4 is provided, at one end, with contact pins 8 regularly arranged in circular configuration, and an eccentric integral cylindrical finger 15, the pins 8 and the finger 15 protruding in the direction of the engageable end of plug element 1. The piece 4 has an indented annular projection 9 one side of which abuts against a shoulder 10 of the inner wall of casing 3, the sleeve 5 bearing on the other side of projection 9 to hold it against the shoulder 10. The stopper 7 holds the gripping collar 6 against the sleeve 5 so that all of the parts of element 1 are held together axially.

The sleeve 5 has a protruding finger 11 forming an indent which engages in any one of the notches of the indented annular projection 9, each notch defining one relative angular position between the cylindrical piece 4 and casing 3.

During assembly of the plug element 1, the finger 11 is engaged in the notch corresponding to the desired position; as the sleeve 5 is fixed relative to the casing 3, it is the angular position of the cylindrical piece 4 which varies.

The female plug element 2 is complementary to the male plug element 1. It comprises a cylindrical casing 12 engageable on the casing 3 when the casings are disposed with a relative angular position defined by a longitudinal flat 16 (FIG. 2) on the inner surface of casing 12 cooperating with a longitudinal plane surface of casing 3.

A cylindrical piece 13 having a series of sockets 14 and an eccentric hole 17 disposed in a manner to cooperate with the pins 8 and the finger 15 of the male plug element 1 is lodged in the casing 12. Piece 13 is provided with an indented circular flange 19 having recesses or notches 20 arranged in a manner corresponding to the arrangement of the notches of the male plug element 1.

The casing 12 has an inner annular projection or shoulder 18 the inner diameter of which is substantially equal to the diameter of the piece 13, the shoulder 18 limiting towards the left (FIG. 1), a cylindrical housing the diameter of which is substantially equal to that of the flange 19 on piece 13.

When the cylindrical piece 13 is engaged in the casing 12, the flange 19 comes to abut against shoulder 18. The angular position of the piece 13 in relation to casing 12 is set by an elastic ring 21 which is lodged in an annular groove 22 in casing 12, the ring 21 having a finger 24 engaging in one of the notches 20 in flange 19 of piece 13 and in a positioning notch 23 provided in the end of casing 12.

The angular position between the cylindrical piece 13 and the casing 12 of the female plug element 2 must, of course, correspond to that between the piece 4 and the casing 3 of the male plug element 1, so that the pins 8 and the finger 15 may engage in the sockets 14 and the eccentric hole 17.

One may thus obtain as many possible relative positions between the two plug elements as there are notches or recesses, but the number of possibilities is at most equal to the maximum number of pins or sockets, the number of pins being at most equal to the number of sockets.

The casing 3 of the male plug element 1 has two diametrically opposed beaks 26 disposed on respective resilient blades 27 each comprised between two longitudinal slots of casing 3 i.e. parallel to its axis, as shown in FIG. 3. The beaks 26 are able to engage in an annular groove 29 in the inner surface of the casing 12 of female plug element 2. Each blade 27 has a protuberance 28 which can be grasped by the user to permit disengagement of the beaks 26 from groove 29 by pressing together the two protuberances.

The gripping collar 6 comprises two coaxial discs 30 and 31 of the same diameter, each having a respective eccentric hole 32, 33 and an inwardly-directed annular projection 34, 35 engaging in an outer annular groove 36 of a third coaxial disc or ring 37 also having an eccentric hole.

In an alternative arrangement, not shown, two separate annular grooves are provided on the third disc or ring, each receiving the projection 34, 35 of one of the first two discs.

By relatively rotating these discs, the section of free passage of the collar 6 varies.

The frictional contact of the discs generally suffices to maintain a gripping position; one may however provide ridges or striations on the first two discs cooperating with ridges or striations of the third disc or ring so as to oppose unwanted rotation of the discs.

One may also provide, on the two plane surfaces of the collar, i.e. on the end surfaces of discs 30 and 31, milled parts 40 as indicated in FIG. 4, to enable actuation of the collar by means of a tool.

I claim:

1. An electric connector comprising first and second plug elements, each having interfitting cylindrical casings engageable by axial movement of one plug element with respect to the other, means for retaining the elements in engaged position comprising, on said first plug element, a resiliant blade integral at both ends with the cylindrical casing of said first plug element and separated therefrom by two axially extending slots, an outwardly projecting beak or latch portion extending from said resilient blade between the ends thereof, an outwardly extending projection between the ends of said blade operable to release engagement of said beak by inward depression thereof, and, on said second plug element, an annular groove forming an annular shoulder resiliently engageable by said beak to retain said plug elements in engagement.

2. A connector according to claim 1, comprising two such blades disposed parallel to and diametrally opposite one another on said cylindrical case.

3. A connector according to claim 1, in which each plug element comprises a body formed of two parts one of which carries contact pieces, the two parts of each body having means defining a single possible relative position of the two bodies to permit interengagement of the two plug elements, the two parts of each body being movable relative to one another and each plug element further comprising securing means for locking the two parts of its body together in any one of several defined positions.

4. A connector according to claim 3, in which the two parts of each body have indents defining said positions and a retaining piece locking the two parts in a selected position.

5. A connector according to claim 4, in which the two parts of each body are cylindrical, coaxial and engageable in one another, the inner part of one body having a finger eccentric to the common axis and parallel to said axis, said finger being engageable in a corresponding hole of the inner part of the other body.

6. An electric connector comprising two mutually interengageable plug elements having means for retaining the elements in an engaged position, said retaining means comprising at least one resilient part carried by one of the elements and having a hooking member engageable with a complementary portion of the other element, said resilient part including a gripping portion which is manually actuable to disengage the hooking member, wherein said resilient part is a blade forming part of the external surface of a cylindrical piece of said one element, said blade being comprised between two generally longitudinal slots in said cylindrical piece, each plug element comprising a body formed of two parts, one of which carries contact pieces, the two parts of each body having means defining a single possible relative position of the two bodies to permit interengagement of the two plug elements, the two parts of each body being movable relative to one another, each plug element further comprising securing means for locking the two parts of its body together in any one of several defined positions, said two parts of each body having indents defining said positions and a retaining piece locking the two parts in a selected position, and wherein one of the parts of one body has a series of notches in circular configuration and the other part has at least one notch, said retaining piece being an elastic ring having a finger engageable in a notch of each part.

* * * * *